(12) United States Patent
Sheng et al.

(10) Patent No.: US 10,764,493 B2
(45) Date of Patent: Sep. 1, 2020

(54) DISPLAY METHOD AND ELECTRONIC DEVICE

(71) Applicant: Lenovo (Beijing) Co., Ltd., Beijing (CN)

(72) Inventors: Xingdong Sheng, Beijing (CN); Jiangtao Gao, Beijing (CN); Lin Wang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 60 days.

(21) Appl. No.: 15/905,206

(22) Filed: Feb. 26, 2018

(65) Prior Publication Data

US 2018/0249075 A1 Aug. 30, 2018

(30) Foreign Application Priority Data

Feb. 24, 2017 (CN) .......................... 2017 1 0104361

(51) Int. Cl.
*G06T 11/00* (2006.01)
*H04N 5/232* (2006.01)
*G06T 7/73* (2017.01)

(52) U.S. Cl.
CPC .......... *H04N 5/23238* (2013.01); *G06T 7/74* (2017.01); *G06T 11/00* (2013.01); *H04N 5/23293* (2013.01); *G06T 2207/30244* (2013.01)

(58) Field of Classification Search
CPC .. H04N 5/23238; H04N 5/23298; G06T 7/74; G06T 11/00
USPC .......................................................... 348/39
See application file for complete search history.

(56) References Cited

FOREIGN PATENT DOCUMENTS

| CN | 204405948 U | 6/2015 |
|---|---|---|
| CN | 205507244 U | 8/2016 |
| CN | 105929968 A | 9/2016 |
| CN | 105955457 A | 9/2016 |
| CN | 106339980 A | 1/2017 |
| CN | 106405845 A | 2/2017 |

OTHER PUBLICATIONS

CN106339980 Machine Translation (Year: 2017).*

* cited by examiner

*Primary Examiner* — Nguyen T Truong
(74) *Attorney, Agent, or Firm* — Anova Law Group, PLLC (57) ABSTRACT

A display method and an electronic device are provided. The display method comprises: displaying a source panorama; based on a viewing angle during displaying the source panorama, determining an initial viewing angle of the destination panorama; and in response to switching from the source panorama to the destination panorama, displaying an image of the destination panorama at the initial viewing angle.

7 Claims, 6 Drawing Sheets

DISPLAY METHOD AND ELECTRONIC DEVICE

CROSS-REFERENCES TO RELATED APPLICATIONS

This application claims the priority of Chinese patent application No. 201710104361.4, filed on Feb. 24, 2017, the entire content of which is incorporated herein by reference.

FIELD OF THE DISCLOSURE

The present disclosure relates to the field of virtual reality (VR) technology and, more particularly, relates to a display method and an electronic device.

BACKGROUND

With the continuous development of virtual reality (VR) technology, more and more electronic devices are implemented with a VR function. To improve the user experience of VR technology, images/videos captured by a panoramic camera are imported into an electronic device, or virtual images generated by the electronic device such as images and videos are adopted, thereby providing immersive experience of various scenes, such as watching games, touring houses, etc.

When a user carries an electronic device to watch images, various images are often switched therebetween. Thus, a method of switching between images is highly desired.

BRIEF SUMMARY OF THE DISCLOSURE

One aspect of the present disclosure provides a display method for an electronic device. The display method comprises: displaying a source panorama; based on a viewing angle during displaying the source panorama, determining an initial viewing angle of the destination panorama; and in response to switching from the source panorama to the destination panorama, displaying an image of the destination panorama at the initial viewing angle.

Another aspect of the present disclosure provides an electronic device. The electronic device comprises: a display for displaying images of a panorama at a plurality of viewing angles and a processor. The processor is for controlling the display to display a source panorama; based on a viewing angle during displaying the source panorama, determining an initial viewing angle of the destination panorama; and in response to switching from the source panorama to the destination panorama, controlling the display to display an image of the destination panorama at the initial viewing angle.

Other aspects of the present disclosure may be understood by those skilled in the art in light of the description, the claims, and the drawings of the present disclosure.

BRIEF DESCRIPTION OF THE DRAWINGS

To more clearly illustrate technical solutions of embodiments or in the prior art, accompany drawings which need to be used in the description of the embodiments or the prior art will be simply introduced. Obviously, the accompany drawings in the following description are merely some embodiments, and for those of ordinary skill in the art, other embodiments can further be obtained according to these accompany drawings without contributing any creative work.

DETAILED DESCRIPTION

Reference will now be made in detail to examples of embodiments of the disclosure, which are illustrated in the accompanying drawings. Wherever possible, the same reference numbers will be used throughout the drawings to refer to the same or like parts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

The present disclosure provides a display method for switching between images, which may be applied to an electronic device such as a VR device, a smart TV having a VR function, and a computer having a VR function, etc.

Figure 1:
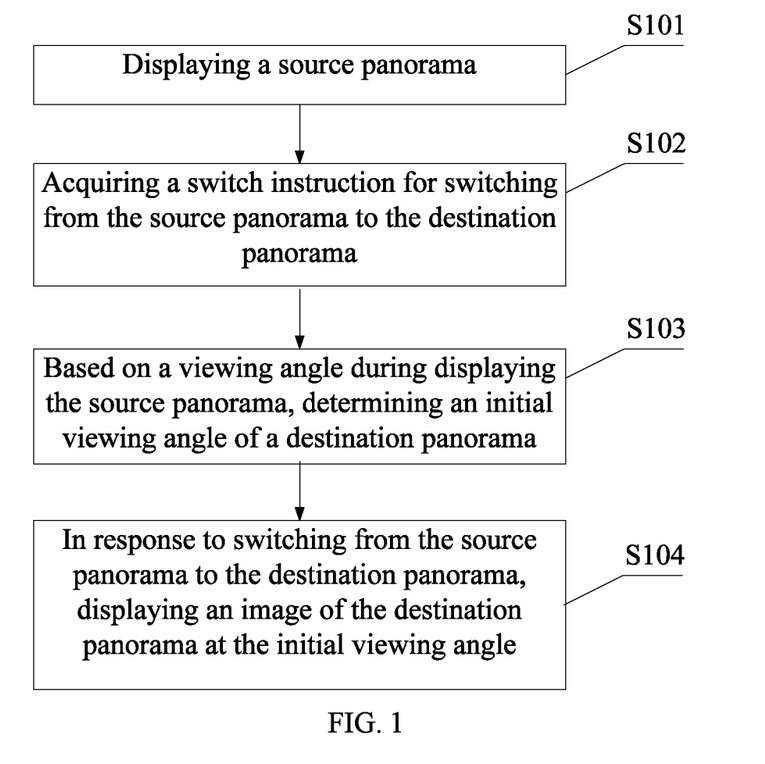
FIG. 1 illustrates a flow chart of an exemplary display method consistent with disclosed embodiments.

FIG. 1 illustrates a flow chart of an exemplary display method consistent with disclosed embodiments. As shown in FIG. 1, at the beginning, a source panorama is displayed (S101). In particular, the panorama stored in the electronic device may be an actual image captured by a 360° panoramic camera, or a panorama generated by the electronic device.

In response to displaying the source panorama, a switch instruction for switching from the source panorama to a destination panorama is generated (S102). In particular, the source panorama and the destination panorama may be relative. For example, when the panorama 1 is switched to the panorama 2, the panorama 1 may be the source panorama, while the panorama 2 may be the destination panorama. When the panorama 2 is switched to the panorama 1, the panorama 2 may be the source panorama, while the panorama 1 may be the destination panorama.

The electronic device may generate the switch instruction for switching from the source panorama to the destination panorama through various approaches according to various application scenarios.

In one embodiment, the user may carry the electronic device or VR glasses paired with the electronic device, the electronic device may detect a rotation angle of the user. For example, when the user carries the electronic device or wears the VR glasses paired with the electronic device on the head, the electronic device may detect a rotation angle of the user's head. The electronic device may include a gyroscope capable of detecting the rotation angle of the user, thereby generating the switch instruction for switching from the source panorama to the destination panorama.

In another embodiment, when the electronic device displays the source panorama, a user gesture may be used to control the switching from the source panorama to the destination panorama, which is called as a switching gesture. That is, the switching gesture may be pre-stored in the electronic device, and in response to the switching gesture performed by the user, the switch instruction for switching from the source panorama to the destination panorama may be generated.

In another embodiment, the user may carry the electronic device or wear the VR glasses paired with the electronic device, in which the electronic device may detect the user's moving direction, thereby generating the switch instruction for switching from the source panorama to the destination panorama.

In another embodiment, the source panorama may be automatically switched to the destination panorama according to the content of the panoramas. That is, the destination panorama may be automatically determined according to the contents of the respective panoramas. In addition, the moment to switch from the source panorama to the destination panorama may be determined according to the content of the panoramas, thereby realizing an automatic switching from the source panorama to the destination panorama.

For example, the user wants to view a target of interest from different perspectives, such as in a live panorama show of football, the user desires a perspective from which the football or a specific player can be always observed when switching from a panorama to another panorama. When the source panorama does not include any targets of interest, a switching from the source panorama to the destination panorama may be desired. The panorama including the target of interest may be determined as the destination panorama and, accordingly, the source panorama may be switched to the destination panorama.

In response to generating the switch instruction for switching from the source panorama to a destination panorama, an initial viewing angle of the destination panorama is determined based on the viewing angle during displaying the source panorama (S103).

In one embodiment, because the source panorama includes a 360° panorama, the viewing angle may be an angle. For example, a space coordinate system may be established to determine at which angle the source panorama is displayed, i.e., determine the viewing angle.

When the source panorama is displayed different viewing angles, different source panoramas may be observed and, meanwhile, the image bending degree may be different.

For example, a spherical coordinate system may be established, in which a viewing angle (0, 60, 0) may indicated looking up. When the source panorama includes the image of the sky, the image of the sky may be observed at the viewing angle (0, 60, 0).

In another embodiment, the viewing angle may refer to the relative position of a viewing angle range image of the source panorama with respect to the entire 360° source panorama, in which the source panorama may be displayed at the viewing angle.

For example, the viewing angle range image may be located at the top left corner position or the upper right corner position of the source panorama.

In another embodiment, the viewing angle may refer to the relative position of a viewing angle range image of the source panorama with respect to the 360° panoramic camera capturing the source panorama, in which the source panorama may be displayed at the viewing angle.

In another embodiment, the panorama stored in the electronic device may be an actual image captured by the 360° panorama camera, and the viewing angle may refer to the relative position of a viewing angle range image of the source panorama with respect to the actual position of the 360° panorama camera, in which the source panorama may be displayed at the viewing angle. For example, the viewing angle range image may be in the east direction of the 360° panoramic camera.

It should be noted that, the user may only be able to observe certain portions of the source panorama due to the limited field of view (FOV) and, accordingly, the electronic device may only display the corresponding portions of the source panorama. That is, when the viewing angle is different, the corresponding portions of the source panorama displayed by the electronic device may be different. That is, the source panorama may be displayed at a plurality of different viewing angles. In the disclosed embodiments, the viewing angle refers to a viewing angle that is closest to the current moment, i.e., the final viewing angle of the source panorama when generating the switch instruction for switching from the source panorama to the destination panorama.

When the source panorama is displayed at a plurality of different viewing angles, at the beginning of switching to the destination panorama from the source panorama, the very beginning viewing angle corresponding to the destination panorama may be referred as the initial viewing angle of the destination panorama.

After switching the source panorama to the destination panorama, the viewing angle of the destination panorama may change.

After switching the source panorama to the destination panorama, the image of the destination panorama is displayed at the initial viewing angle (S104).

It should be noted that, the user may be able to view a 360° image of the destination panorama when carrying the electronic device or wearing the VR glasses paired with the electronic device. However, at a certain moment, the electronic device may only display certain portions of the destination panorama, in which the certain portions of the destination panorama to be displayed may be determined by the initial viewing angle.

The present disclosure provides a display method. The electronic device may display the source panorama. In response to acquiring the switch instruction for switching from the source panorama to the destination panorama, according to the viewing angle during displaying the source panorama, the initial viewing angle of the destination panorama may be determined. In response to switching to the destination panorama, the image of the destination panorama at the initial viewing angle is displayed, thereby realizing a switch between the source panorama and the destination panorama.

It should be noted that the initial viewing angle may be determined by various approaches for different application scenarios. Certain exemplary approaches to determine the initial viewing angle for different application scenarios will be explained as follows.

In the first application scenario, a jump between the panoramas when switching between the panoramas is highly desired to be prevented. The jump between the panoramas when switching between the panoramas may be explained as follows by taking a house tour as an example.

Assuming that the user is currently viewing an image of the entrance, when the user desires to see the image of the living room, the image currently viewed by the user is switched to the image of the living room. When the initial viewing angle of the image of the living room is from the living room to the entrance, the user may experience a visual jump, because normally the initial viewing angle of the image of the living room is preferred to be from the entrance to the living room. Due to the visual jump, the user may observe discontinuous images, and the user may repeatedly switch between the two images to confirm whether the current switch is correct. That is, the user may have to repeatedly operate the electronic device to view the panoramas on the electronic device, degrading the data processing efficiency of the electronic device.

Thus, in the disclosed embodiments, determining an initial viewing angle of the destination panorama based on the viewing angle during displaying the source panorama (S103) may further include: determining a first observation position corresponding to the source panorama as a starting point, determining a second observation position corresponding to the destination panorama as an ending point, and determining the initial viewing angle of the destination panorama as a direction of a connecting line from the starting point to the ending point.

In one embodiment, the panorama stored in the electronic device may be the actual image captured by the 360° panoramic camera, the first observation position may be determined as the position of the 360° panoramic camera where the source panorama is captured, and the second observation position may be determined as the position of the 360° panoramic camera where the destination panorama is captured.

In another embodiment, the panoramas stored in the electronic device may be virtually generated by the electronic device, the first observation position may be determined as a reference position where the source panorama is generated, i.e., the source panorama may be generated by taking the reference position as the observation point. Accordingly, the second observation position may be determined as a reference position where the destination panorama is generated.

Figure 2:
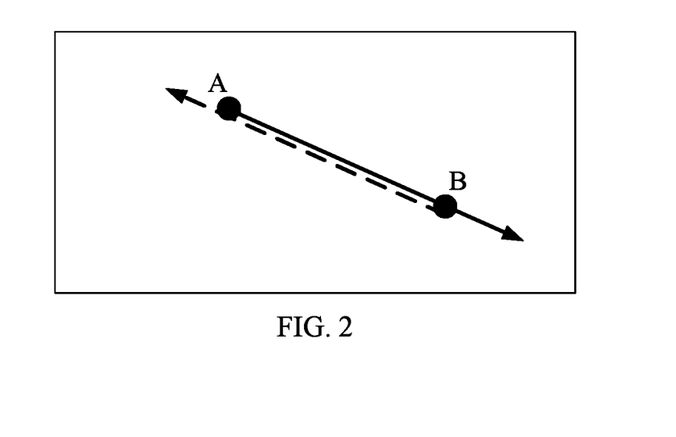
FIG. 2 illustrates a direction of an initial viewing angle in an exemplary display method consistent with disclosed embodiments.

FIG. 2 illustrates a direction of an initial viewing angle in an exemplary display method consistent with disclosed embodiments. As shown in FIG. 2, the point A is the first observation position, the point B is the second observation position, and the initial viewing angle is the vector direction of the connecting line from the point A to the point B, i.e., the direction indicated by the solid arrow shown in FIG. 2.

Thus, when touring the house, the image of the entrance may correspond to the first observation position, and the image of the living room may correspond to the second observation position. Accordingly, the viewing angle may be determined as the direction indicated by the solid arrow shown in FIG. 2. In this application scenario, the source panorama and the destination panorama may or may not have a common image. The switching between the source and destination panoramas may be in line with people's logical through.

In the second application scenario, the image of the source panorama displayed at the viewing angle may include a certain portion of the destination panorama. That is, the source panorama and the destination panorama may include a same image, i.e., an image of the certain portion.

In one embodiment, the image of the source panorama displayed at the viewing angle may include an object, such as a table. Meanwhile, the destination panorama may also include the table, assuming that the table is attached to the wall of the living room. The image of the source panorama displayed at the viewing angle may include the entrance of the living room and the table. The user's goal is to view the table, then the user gets closer and closer to the table from the entrance of the living room and finally stops in front of the table, in which the viewing angle may be always the direction towards to the table while the image shown by the electronic device may be constantly changing as the user gets closer and closer to the table.

Figure 3:
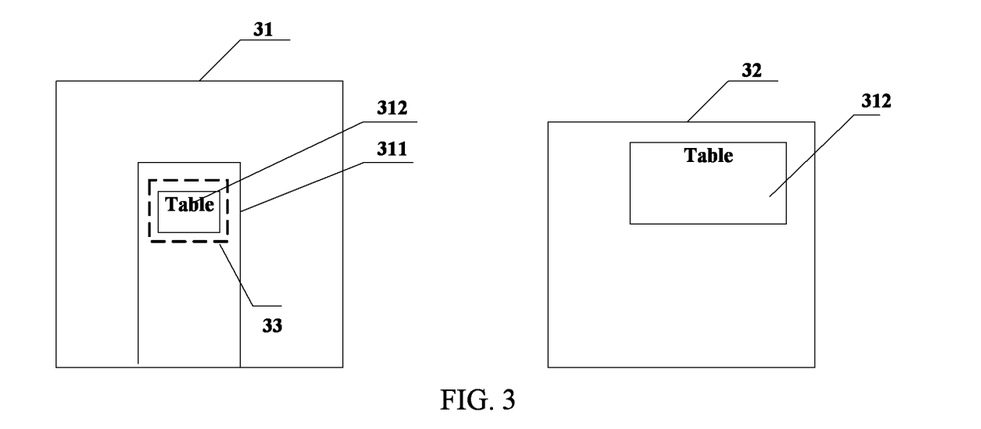
FIG. 3 illustrates a schematic diagram of displaying an exemplary source panorama and an exemplary destination panorama at a same viewing angle consistent with disclosed embodiments.

FIG. 3 illustrates a schematic diagram of displaying an exemplary source panorama and an exemplary destination panorama at a same viewing angle consistent with disclosed embodiments. As shown in FIG. 3, the viewing angle range image 31 may be the image of the source panorama displayed at the viewing angle, and the destination image 32 may be the image of the destination panorama displayed at the viewing angle. The viewing angle range image 31 may include an entrance 311 and a table 312.

The viewing angle range image 31 may be an image where the table is observed in a far range, and the destination image 32 may be an image where the table is observed in a close range. Thus, the area of the table displayed in the destination image 32 may be larger than the area of the table displayed in the viewing angle range image 31, however, the area of displayed by the destination image 32 may be smaller than the area displayed by the viewing angle range image 31. That is, the area of the living room displayed by the destination image 32 may be smaller than the area of the living room displayed by the viewing angle range image 31.

In practical applications, the user carrying the electronic device or wearing the VR glasses paired with the electronic device may be able to view the images without moving around. The electronic device may provide corresponding forward, or, backward, or, left, or, right, etc. physical keys or virtual keys, through which the user may simulate their own sporting scenes.

Thus, in the disclosed embodiments, determining an initial viewing angle of the destination panorama based on the viewing angle during displaying the source panorama (S103) may further include: acquiring the viewing angle of the source panorama before being switched to the destination panorama; and according to the viewing angle of the source panorama before being switched to the destination panorama, determining the initial viewing angle of the destination panorama.

In certain embodiments, the initial viewing angle of the destination panorama may even be determined as the viewing angle of the source panorama before being switched to the destination panorama.

The third application scenario is based on the second application scenario. That is, when the image of the source panorama displayed at the viewing angle includes a certain portion of the destination panorama, how to display the destination panorama with the best viewing angle.

Figure 4:
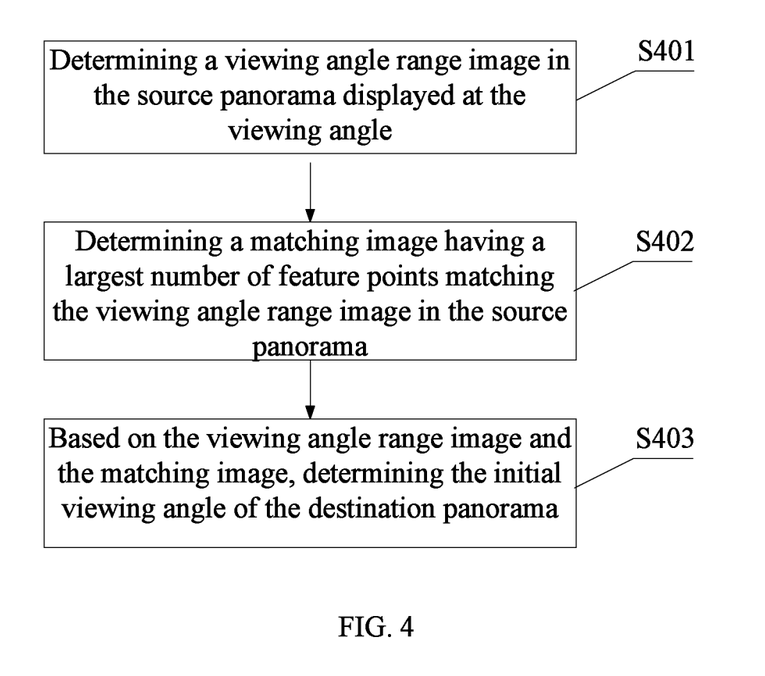
FIG. 4 illustrates a flow chart of an exemplary method for determining an initial viewing angle of a destination panorama according to a viewing angle of a source panorama before switching to the destination panorama consistent with disclosed embodiments.

FIG. 4 illustrates a flow chart of an exemplary method for determining an initial viewing angle of a destination panorama according to a viewing angle of a source panorama before switching to the destination panorama consistent with disclosed embodiments.

As shown in FIG. 4, at the beginning, the viewing angle range image is determined in the source panorama displayed at the viewing angle (S401).

Referring to FIG. 3, the viewing angle range image 31 in FIG. 3 may be assumed to be the viewing angle range image in the source panorama displayed at the viewing angle, i.e., the viewing angle range image determined in the step S401.

Returning to FIG. 4, in response to determining the viewing angle range image in the source panorama displayed at the viewing angle, a matching image having the largest number of feature points matching the viewing angle range image is determined in the source panorama (S402).

Referring to FIG. 3, it is assumed that the matching image is the area 33 denoted by the dashed frame in the viewing angle range image 31.

Returning to FIG. 4, in response to determining the matching image, the initial viewing angle of the destination panorama is determined based on the viewing angle range image and the matching image (S403).

In one embodiment, the viewing angle corresponding to the matching image may be determined as the initial viewing angle of the destination panorama.

In another embodiment, the position of the matching image in the source panorama may be determined as the initial viewing angle of the destination panorama.

In another embodiment, the viewing angle of the source panorama at which only the matching image is displayed may be determined as the initial viewing angle of the destination panorama.

Figure 5:
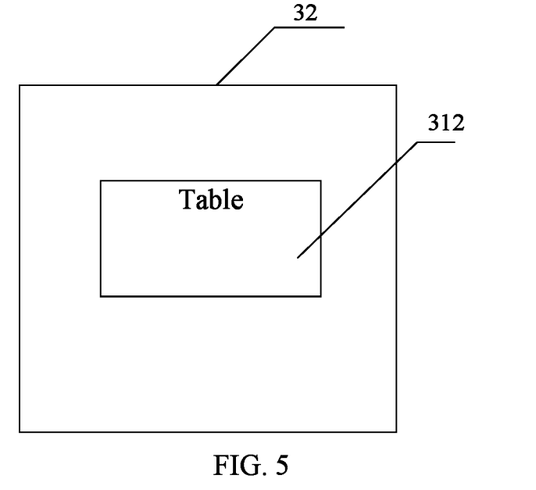
FIG. 5 illustrates an exemplary destination panorama displayed at an initial viewing angle determined by an exemplary method in FIG. 4 consistent with disclosed embodiments.

FIG. 5 illustrates an exemplary destination panorama displayed at the initial viewing angle determined by an exemplary method in FIG. 4 consistent with disclosed embodiments.

As shown in FIG. 3 and FIG. 5, the table in FIG. 5 is located at the middle of the destination panorama, thereby providing a better and a more completed image of the table to the user. As a comparison, the table in FIG. 3 is located at the upper left corner of the destination panorama.

In the fourth application scenario, the electronic device may store the relative positions of the respective images in the panorama with respect to the viewing position corresponding to the respective images in the panorama.

In one embodiment, the panoramas stored in the electronic device may be captured by the 360° panorama camera and, meanwhile, the 360° panorama camera may record the relative positions of the respective images in a panorama with respect to the 360° panoramic camera during capturing the panorama.

In another embodiment, the panoramas stored in the electronic device may be virtually created and, meanwhile, the 360° panorama camera may record the relative positions of the respective images in the panorama with respect to the reference position of the panorama.

Accordingly, in the disclosed embodiments, determining an initial viewing angle of the destination panorama based on the viewing angle during displaying the source panorama (S103) may further include: determining an offset angle of the electronic device during switching from the source panorama to the destination panorama; acquiring a relative position of the viewing angle range image in the source panorama displayed at the viewing angle with respect to the first observation position corresponding to the source panorama; and based on the relative position and the offset angle, determining the initial viewing angle of the destination panorama.

The electronic device may include a gyroscope capable of detecting the offset angle of the electronic device. Given that the relative position of the viewing angle range image with respect to the first observation position is the east direction, and the offset angle is shifted by 45° to the right side, then the initial viewing angle may be determined to be the northeast direction.

In the fifth application scenario, the user may only be interested in a hotspot target in the panorama.

The user wants to see a particular target or location from different perspectives. For example, in the live panorama show of football, the user desires a perspective from which the football or a specific player can be always observed when switching from a panorama to another panorama, in which better user experience may be provided by adding a hotspot perspective to each panorama.

Figure 6:
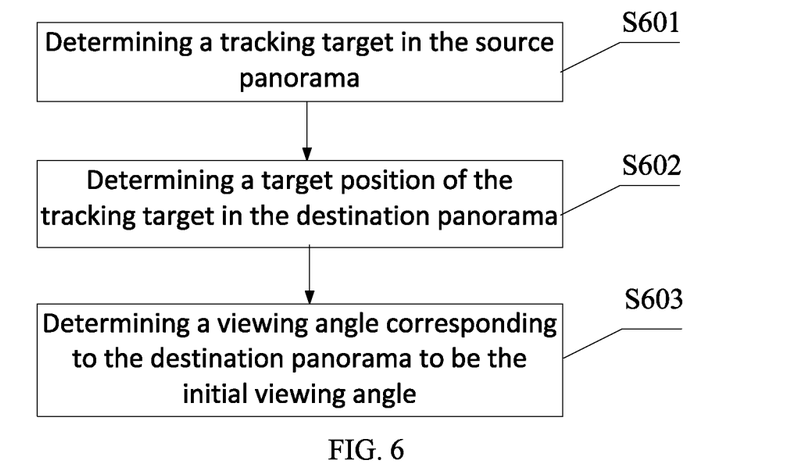
FIG. 6 illustrates a flow chart of an exemplary method for determining an initial viewing angle of a destination panorama according to a viewing angle during displaying a source panorama consistent with disclosed embodiments.

FIG. 6 illustrates a flow chart of an exemplary method for determining an initial viewing angle of a destination panorama according to a viewing angle during displaying a source panorama consistent with disclosed embodiments.

As shown in FIG. 6, at the beginning, a tracking target is determined in the source panorama (S601).

When the electronic device displays the source panorama, the user may determine the tracking target by a corresponding preset gesture, or a control device (e.g., button or touch board) provided on the electronic device or the VR glasses paired with the electronic device.

In response to determining the tracking target in the source panorama, a target position of the tracking target is determined in the destination panorama (S602).

In one embodiment, the characteristics of the tracking target in the source panorama may be obtained by an image matching. Then an object with the corresponding characteristics in the target panorama may be determined as the tracking target.

The electronic device may pre-store a plurality of panoramas, and the method for acquiring the destination panorama may include the following steps: from the respective panoramas, determining respective tracking panoramas including the tracking target; determining tracking position information of the tracking target in the respective tracking panoramas; and based on the tracking position information, determining a switching order of the respective tracking panoramas. According to the switching order of the respective tracking panoramas, the destination panorama may be determined.

In one embodiment, the tracking position information may include the movement direction tracking information of the target.

In response to determining the target position of the tracking target in the destination panorama, the viewing angle corresponding to the target position is determined as the initial viewing angle of the destination panorama (S603).

Ion one embodiment, the panorama in the electronic device may be captured by a 360° panoramic camera, then the initial viewing angle may be the direction of the connection line from the position of the 360° panoramic camera capturing the panorama to the target position.

In one embodiment, the source panorama and the destination panorama may have the same image. As shown in FIG. 3, the viewing angle range image 31 may include a partial image of the source panorama, and the destination image 32 may include a partial image of the destination panorama. Both the viewing angle range image 31 and the destination image 32 include the table.

Generally speaking, the object in the user's field of vision will gradually become larger as the user gets closer to the object, a method for achieving such a result will be explained as follows, i.e., for smoothly transiting from the source panorama to the destination panorama.

Figure 7:
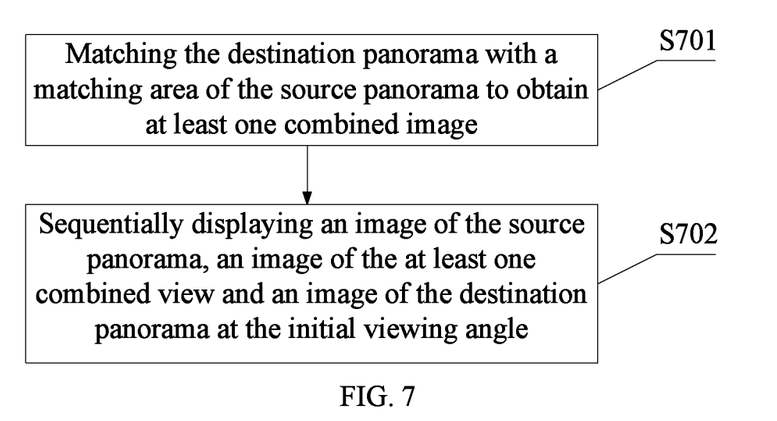
FIG. 7 illustrates a flow chart of an exemplary method for displaying a destination panorama at an initial viewing angle consistent with disclosed embodiments.

FIG. 7 illustrates a flow chart of an exemplary method for displaying a destination panorama at an initial viewing angle consistent with disclosed embodiments.

As shown in FIG. 7, at the beginning, the destination panorama is matched with a matching area of the source panorama to obtain at least one combined image (S701).

The combined image may be rendered images which are sequentially displayed when switching from the source panorama to the destination panorama. A larger number of the combined images may lead to a smoother transition from the viewing angle range image 31 to the destination image 32.

In particular, the combined image may be obtained by various ways according to various application scenarios. In one embodiment, the combined image may be obtained as follows. According to time sequence information displayed by the respective combination images, the matching image belonging to the destination panorama and the matching image belonging to the source panorama may be subjected to affine transform to obtain at least one combined image, in which the matching image belonging to the destination panorama and the matching image belonging to the source panorama may have the same total number of rows of pixels (i.e., the same total number of pixel rows) and the same total number of columns of pixels (i.e., the same total number of pixel columns).

In response to obtaining the at least one combined image, the images of the source panorama, at least one combined view and destination panorama are sequentially displayed, each of which is displayed at the initial viewing angle, (S702).

Figure 8:
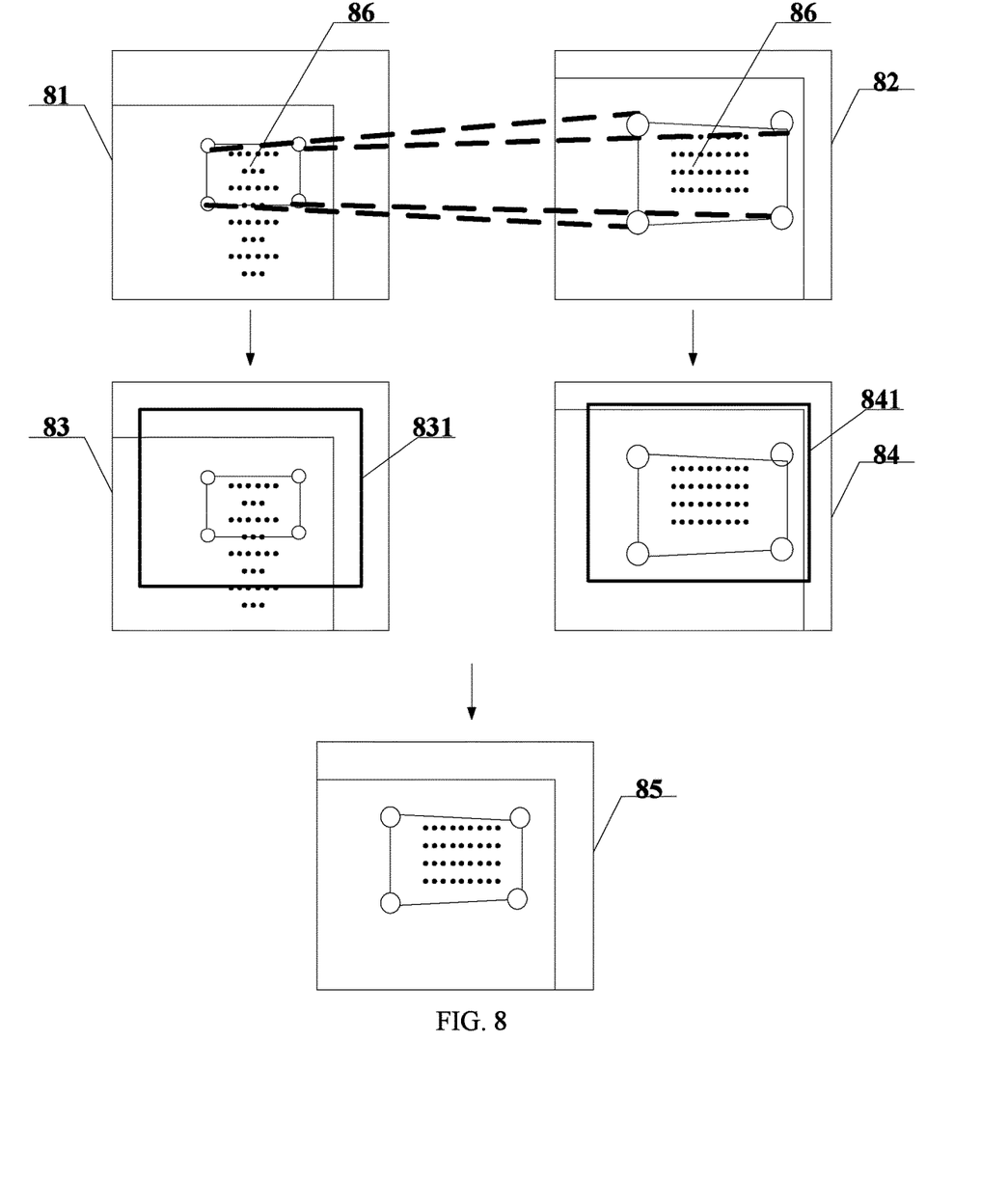
FIG. 8 illustrates a schematic diagram of merging an exemplary source panorama and an exemplary destination panorama consistent with disclosed embodiments.

FIG. 8 illustrates a schematic diagram of merging an exemplary source panorama and an exemplary destination panorama consistent with disclosed embodiments.

FIG. 8 illustrates a viewing angle range image 81 in the source panorama and a destination image 82 in the destination panoramic.

First, a first image 83 corresponding to the viewing angle range image 81 and a second image 84 corresponding to the target image 82 may be obtained by affine transforming the viewing angle range image 81 and the destination image 82, respectively. Then, the first image 83 and the second image 84 may be matched to obtain a matching image.

The matching image of the viewing angle range image 81 and the destination image 82 may include a table 86. FIG. 8 illustrates the matching pattern of the table in the viewing angle range image 81 and the table in the destination image 82, as indicated by the dashed lines.

FIG. 8 also illustrates the first image 83 may include a matching image 831, and the second image 84 may include a matching image 841, as indicated by the solid frames. The matching image 831 in the first image 83 and the matching image 841 in the second image 84 may be merged to obtain a combined image 85.

In one embodiment, the matching image 831 in the first image 83 may be merged with the matching image 841 in the second image 84 according to the following equation:

$(MX_{k(i,j)}, MY_{k(i,j)}) = \text{alpha}_k * (IAX_{(i,j)}, IAY_{(i,j)}) + (1-\text{alpha}_k)(IBX_{(i,j)}, IBY_{(i,j)}); \text{alpha}_k = (N-k)/(N+1)$ where i is a positive integer greater than or equal to 0 less than the total number of the pixel rows in the matching image, j is a positive integer greater than or equal to 0 less than the total number of the pixel columns in the matching image, and $(MX_{k(i,j)}, MY_{k(i,j)})$ is the pixel value of the pixel (i, j) in the $k^{th}$ combined image, $(IAX_{(i,j)}, IAY_{(i,j)})$ is the pixel value of the pixel (i, j) in the matching image in the destination panorama, $(IBX_{(i,j)}, IBY_{(i,j)})$ is the pixel value of the pixel (i, j) in the matching image in the source panorama, and $\text{alpha}_k$ is the weighted weight of the $k^{th}$ combined image, N is the total number of combined images, and k is a positive integer greater than or equal to 1 less than or equal to N.

Figure 9:
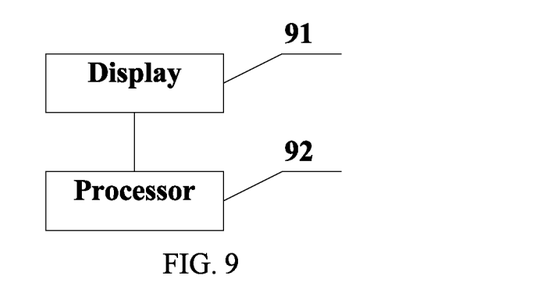
FIG. 9 illustrates a block diagram of an exemplary electronic device consistent with disclosed embodiments.

The present disclosure also provides an electronic device corresponding to the display method. FIG. 9 illustrates a block diagram of an exemplary electronic device consistent with disclosed embodiments.

As shown in FIG. 9, the electronic device may comprise: a display 91 for displaying images of a panorama at a plurality of viewing angles; a processor 92 for controlling the display 91 to display a source panorama, acquiring a switch instruction for switching from the source panorama to a destination panorama, determining an initial viewing angle of the destination panorama based on a viewing angle during displaying the source panorama; and controlling the display 91 to display an image of the destination panorama at the initial viewing angle when being switched to the destination panorama.

In certain embodiments, when determining an initial viewing angle of the destination panorama based on a viewing angle during displaying the source panorama, the processor may be further for:

determining a first observation position corresponding to the source panorama as a starting point;

determining a second observation position corresponding to the destination panorama as an ending point; and determining the initial viewing angle of the destination panorama as a direction of a connecting line from the starting point to the ending point.

In certain other embodiments, when determining an initial viewing angle of the destination panorama based on a viewing angle during displaying the source panorama, the processor may be further for:

acquiring the viewing angle of the source panorama before being switched to the destination panorama; and according to the viewing angle of the source panorama before being switched to the destination panorama, determining the initial viewing angle of the destination panorama.

In certain other embodiments, when determining an initial viewing angle of the destination panorama based on a viewing angle during displaying the source panorama, the processor may be further for:

determining a tracking target in the source panorama;

determining a target position of the tracking target in the destination panorama; and based on the second observation position corresponding to the destination panorama and the target position, determining the initial viewing angle.

In certain other embodiments, when determining an initial viewing angle of the destination panorama based on a viewing angle during displaying the source panorama, the processor may be further for:

determining an offset angle of the electronic device during switching from the source panorama to the destination panorama;

acquiring a relative position of the viewing angle range image in the source panorama displayed at the viewing angle with respect to the first observation position corresponding to the source panorama; and based on the relative position and the offset angle, determining the initial viewing angle of the destination panorama.

In certain embodiments, when determining the initial viewing angle of the destination panorama according to the viewing angle of the source panorama before being switched to the destination panorama, the processor may be further for:

determining a viewing angle range image in the source panorama displayed at the viewing angle;

determining a matching image having the largest number of feature points matching the viewing angle range image in the source panorama; and based on the viewing angle range image and the matching image, determining the initial viewing angle of the destination panorama.

In certain embodiments, when controlling the display to display the image of the destination panorama at the initial viewing angle, the processor is further for:

matching the destination panorama with a matching area of the source panorama to obtain at least one combined image; and sequentially displaying the images of the source panorama, at least one combined view and destination panorama at the initial viewing angle.

The present disclosure provides a display method. The electronic device may display the source panorama. In response to acquiring the switch instruction for switching from the source panorama to the destination panorama, according to the viewing angle during displaying the source panorama, the initial viewing angle of the destination panorama may be determined. In response to switching to the destination panorama, the image of the destination panorama at the initial viewing angle is displayed, thereby realizing a switch between the source panorama and the destination panorama.

In the present disclosure, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the present specification are described in a progressive manner, in which each embodiment focusing on aspects different from other embodiments, and the same and similar parts of each embodiment may be referred to each other.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A display method for an electronic device, comprising:
   displaying a source panorama;
   determining an initial viewing angle of a destination panorama; and
   in response to switching from the source panorama to the destination panorama, displaying an image of the destination panorama at the initial viewing angle;
   wherein determining an initial viewing angle of a destination panorama includes:
      acquiring a viewing angle of the source panorama before being switched to the destination panorama;
      determining a viewing angle range image in the source panorama displayed at the viewing angle before being switched to the destination panorama;
      determining a matching image having a largest number of feature points matching the viewing angle range image in the source panorama; and
      based on the viewing angle range image and the matching image, determining the initial viewing angle of the destination panorama.

2. The display method according to claim 1, wherein displaying the image of the destination panorama at the initial viewing angle further includes:
   matching the destination panorama with a matching area of the source panorama to obtain at least one combined image; and
   sequentially displaying an image of the source panorama, an image of the at least one combined view and an image of the destination panorama at the initial viewing angle.

3. The display method according to claim 1, further including:
   acquiring a switch instruction for switching from the source panorama to the destination panorama.

4. A display method for an electronic device, comprising:
   displaying a source panorama;
   determining an initial viewing angle of a destination panorama; and
   in response to switching from the source panorama to the destination panorama, displaying an image of the destination panorama at the initial viewing angle;
   wherein determining the initial viewing angle of the destination panorama includes:
   determining a tracking target in the source panorama;
   determining a target position of the tracking target in the destination panorama; and
   determining a viewing angle corresponding to the tracking target in the destination panorama to be the initial viewing angle.

5. An electronic device, comprising:
   a display for displaying images of a panorama at a plurality of viewing angles; and
   a processor for:
      controlling the display to display a source panorama,
      determining a first observation position corresponding to the source panorama as a starting point
      determining a second observation position corresponding to the destination panorama as an ending point;
      determining an initial viewing angle of a destination panorama as a direction of a connecting line from the starting point to the ending point; and in response to switching from the source panorama to the destination panorama, controlling the display to display an image of the destination panorama at the initial viewing angle.

6. The electronic device according to claim 5, wherein when displaying the image of the destination panorama at the initial viewing angle, the processor is further for:
   matching the destination panorama with a matching area of the source panorama to obtain at least one combined image; and
   sequentially displaying an image of the source panorama, an image of the at least one combined view and an image of the destination panorama at the initial viewing angle.

7. The electronic device according to claim 5, wherein the processor is further for:
   acquiring a switch instruction for switching from the source panorama to the destination panorama.

* * * * *